US012632794B2

(12) United States Patent
Xiao et al.

(10) Patent No.: US 12,632,794 B2
(45) Date of Patent: May 19, 2026

(54) METHOD AND SYSTEM FOR CROSS-CHAIN CONSENSUS ORIENTED TO FEDERATED LEARNING

(71) Applicant: Huazhong University of Science and Technology, Wuhan (CN)

(72) Inventors: Jiang Xiao, Wuhan (CN); Xiaohai Dai, Wuhan (CN); Huichuwu Li, Wuhan (CN); Chen Yu, Wuhan (CN); Hai Jin, Wuhan (CN)

(73) Assignee: Huazhong University of Science and Technology, Wuhan (CN)

( * ) Notice: Subject to any disclaimer, the term of this patent is extended or adjusted under 35 U.S.C. 154(b) by 1034 days.

(21) Appl. No.: 17/644,425

(22) Filed: Dec. 15, 2021

(65) Prior Publication Data

US 2022/0318688 A1 Oct. 6, 2022

(30) Foreign Application Priority Data

Apr. 1, 2021 (CN) .......................... 202110359146.5
Apr. 7, 2021 (CN) .......................... 202110391401.4
May 7, 2021 (CN) .......................... 202110497514.2

(51) Int. Cl.
*G06N 20/20* (2019.01)
*G06N 3/098* (2023.01)

(52) U.S. Cl.
CPC ............. *G06N 20/20* (2019.01); *G06N 3/098* (2023.01)

(58) Field of Classification Search
CPC .......... G06N 20/20; G06N 7/01; G06N 20/00; G06N 3/098; G06F 21/6245; G06F 16/27; G06F 18/214; G06F 21/64; G06Q 40/04
See application file for complete search history.

(56) References Cited

U.S. PATENT DOCUMENTS

2021/0067339 A1* 3/2021 Schiatti .................. G06N 20/00
2021/0234668 A1* 7/2021 Manamohan ......... H04L 9/0825
(Continued)

OTHER PUBLICATIONS

Kim, Hyesung, et al. "Blockchained on-device federated learning." IEEE Communications Letters 24.6 (2019): 1279-1283. (Year: 2019).*

(Continued)

*Primary Examiner* — Matthew Ell
*Assistant Examiner* — Blaine T Basom
(74) *Attorney, Agent, or Firm* — Michael Ye; Kalos Athena Wang PLLC

(57) ABSTRACT

The present invention relates a method and a system for cross-chain consensus oriented to federated learning, comprising: conducting intra-cluster single-chain federated learning and collecting local update information; sending updates after consensus to a second federation so as to execute cross-cluster gradient exchange; receiving a verification result of cross-cluster gradient update consensus fed back from the second federation; and conducting local model update based on the verification result. After implementation of the update consensus, the present invention provides rewards and punishments based on the contributions of the cluster representatives, thereby encouraging the cluster representatives in the computing nodes to act honestly, so that the participants can actively help the model update.

2 Claims, 3 Drawing Sheets

(56) References Cited

U.S. PATENT DOCUMENTS

| | | | | |
|---|---|---|---|---|
| 2021/0374503 | A1* | 12/2021 | Kim | G06N 3/10 |
| 2021/0398017 | A1* | 12/2021 | Garg | H04L 9/50 |

OTHER PUBLICATIONS

Kuo, Tsung-Ting, Jihoon Kim, and Rodney A. Gabriel. "Privacy-preserving model learning on a blockchain network-of-networks." Journal of the American Medical Informatics Association 27.3 (2020): 343-354. (Year: 2020).*

Lepore, Cristian, et al. "A survey on blockchain consensus with a performance comparison of PoW, PoS and pure PoS." Mathematics 8.10 (2020): 1782. (Year: 2020).*

Andreina, Sebastien, et al. "BaFFLe: Backdoor detection via Feedback-based Federated Learning." arXiv preprint arXiv:2011.02167 (2020). (Year: 2020).*

Zhou, Sicong, et al. "Pirate: A blockchain-based secure framework of distributed machine learning in 5g networks." IEEE Network 34.6 (2020): 84-91. (Year: 2020).*

Wang, Gang. "RepShard: Reputation-based sharding scheme achieves linearly scaling efficiency and security simultaneously." 2020 IEEE International Conference on Blockchain (Blockchain). IEEE, 2020. (Year: 2020).*

Pejó, Balázs, and Gergely Biczók. "Quality Inference in Federated Learning with Secure Aggregation." arXiv preprint arXiv:2007.06236 (Mar. 23, 2021). (Year: 2021).*

Kang, Jiawen, et al. "Incentive mechanism for reliable federated learning: A joint optimization approach to combining reputation and contract theory." IEEE Internet of Things Journal 6.6 (2019): 10700-10714. (Year: 2019).*

Kang, Jiawen, et al. "Scalable and Communication-efficient Decentralized Federated Edge Learning with Multi-blockchain Framework." arXiv preprint arXiv:2008.04743 (2020). (Year: 2020).*

Short, Andrew Ronald, et al. "Using blockchain technologies to improve security in federated learning systems." 2020 IEEE 44th annual computers, software, and applications conference (COMPSAC). IEEE, 2020. (Year: 2020).*

Chai, Haoye, et al. "A hierarchical blockchain-enabled federated learning algorithm for knowledge sharing in internet of vehicles." IEEE Transactions on Intelligent Transportation Systems 22.7 (2020): 3975-3986. (Year: 2020).*

* cited by examiner

METHOD AND SYSTEM FOR CROSS-CHAIN CONSENSUS ORIENTED TO FEDERATED LEARNING

This application claims the benefit of the Chinese Patent Applications No. CN 202110359146.5 filed on Apr. 1, 2021, No. CN 202110391401.4 filed on Apr. 7, 2021 and No. CN 202110497514.2 filed on May 7, 2021, which are hereby incorporated by reference as if fully set forth herein.

BACKGROUND OF THE INVENTION

1. Technical Field

The present invention relates to federated learning, and more particularly to a method and system for cross-chain consensus oriented to federated learning.

2. Description of Related Art

In recent years, as privacy security receives more and more attention, federated learning (FL) has been extensively applied in the fields having extremely high requirements in terms of data privacy, such as finance, healthcare, insurance, credit check, services, vehicular autonomy, and indoor positioning. For example, China Patent Document CN112418520A discloses a credit card transaction risk prediction method based on FL, which applies FL to the field of finance for transaction risk prediction. China Patent Document CN112201342A discloses a medical auxiliary diagnosis method, device, equipment and storage medium based on FL, which applies FL to the field of healthcare for auxiliary diagnosis. China Patent Document CN112446791A discloses an automobile insurance grading method, device, equipment and storage medium based on federal learning, which applies FL to the field of insurance for rating. China Patent Document CN112153650A discloses a reliable FL method and system based on terminal reputation in a wireless network, which applies FL to the field of credit check. China Patent Document CN111899076A discloses an aviation service customization system and method based on an FL technology platform, which applies FL to the field of services for aviation service customization. China Patent Document CN111290381A discloses an FL experiment system based on unmanned vehicle, which applies FL to the field of vehicular autonomy. China Patent Document CN110632554A discloses indoor positioning method, device, terminal equipment and medium based on federal learning, which applies FL to the field of indoor positioning.

Due to industry competition, privacy security, and complicated administrative procedures, data sharing is challenging even to departments in the same company, causing data islanding an issue to be addressed. With FL, all participating parties can conduct machine learning under coordination of cooperative servers with data kept locally, and the learning efficiency is comparable to that of a center-based dataset.

FL based on a central server has four major challenges: (1) when the coordinating server has a breakdown, FL at participating parties is undesirably terminated; (2) a malicious coordinating server may retroactively infer distribution of original data using the update information provided by individual nodes, leading to risk of privacy violation; (3) some malicious participating parties may poison the entire model by submitting inferior update parameters; and (4) without incentive mechanisms, individual participating parties lack for motive of actively to contribute to the model update. An ideal FL frame should be decentralized and incorruptible, and has an incentive mechanism to ensure continuous update. Since these challenges can be exactly dealt with by a blockchain system, it is natural that blockchain-based federated learning (BFL) have become a hotspot technique.

A team of researchers from Tsinghua Shenzhen International Graduate School uses a smart contract to provide decentralized control capability and key management, so that the resulting FL system can work in case of node breakdowns. For example, China Patent Document CN111212110A discloses a BFL system and method. The system includes: a model training module used for updating a machine learning model in the FL process and aggregating the change values of the machine learning model; an intelligent contract module used for providing decentralized control function and key management function in the process of FL; and a storage module based on the IPFS protocol used to provide a decentralized information storage mechanism for the intermediate information in the FL process. The model training module, the intelligent contract module based on the block chain technology, and the storage module based on the IPFS protocol are simultaneously operating on each node participating in federal learning. This enables complete decentralization of the whole system, and failure or removal of any node will not influence FL on other nodes, making the system more robust than the conventional frame.

A team of researchers from Zhejiang University of Technology uses the blockchain technology to establish a noise committee in every round of training. Members of the noise committee add noise to their local models, thereby preventing a malicious node from retroactively inferring data feature distribution of original data. For example, China Patent Document CN112434280A discloses a BFL defense method, which includes: the participants establishing intelligent contracts with authorities; the on-register participants obtaining models from the block chain and carrying out local training, uploading the trained local models and corresponding training time to corresponding block nodes and broadcasting the models to the block chain; constructing a noise committee for each on-line participant, and adding noise to the local model of the corresponding on-line participant by using the noise committee to update the local model to obtain an updated model; establishing a verification committee for all on-register participants, verifying the prediction reliability and the authenticity of each updating model by utilizing the verification committee according to the data set and the training time, and recording the updating model passing the verification in a new block node; and the authority acquiring all updated models passing the verification from the block nodes and aggregating the updated models to obtain an aggregated model, and the aggregated model being broadcasted to the block chain for the next round of registered participants to download local training.

A team of researchers from WeBank Co., Ltd. proposes a dual-committee verification mechanism for timely detecting and avoiding poisoning attacks conducted by malicious nodes. For example, China Patent Document CN111723946A discloses an FL method and device applied to block chains. The method includes: the first committee node acquiring first local model information from any non-committee node; the first committee node determining a first verification result of the first committee node on the non-committee node according to a local verification data set of the first committee node and the first local model information; the first committee node sending the first verification result to each second committee node; and if the first committee node determines that the committee nodes agree on the first local model information, updating an FL model at least according to the first local model information. When the method is applied to fintech, the training of the FL model is granted only after the first local model information is known, so that the block link point association cooperation can be found in time.

A team of researchers from Shandong Inspur Artificial Intelligence Research Institute Co., Ltd. proposes an incentive method for giving rewards according to training data provided by individual participants during training. For example, CN110827147A discloses an FL incentive method and system based on alliance chain, which relates to the field of the blockchain technology and implement the technical scheme of: constructing a federation chain by a transaction main body and an operation main body; encrypting and aligning user groups of transaction subjects on the alliance chain, and determining a common user group and a common characteristic dimension; the operation subject training the machine learning model by using the determined common user group and common characteristic dimension until the loss function is converged, and the model training is completed; and the operation main body scoring the credit of the behavior generated on the alliance chain, mapping the credit point to the transaction cost, and stimulating each transaction main body to maintain the ledger through the transaction cost. For example, China Patent Document CN111125779A discloses a BFL method and device. The method includes: determining a block chain; the coordinator node creating a FL task according to the model original data sent by each participant node; receiving training data obtained by local training of participant nodes; sending parameters to be updated to other participant nodes according to the training data so that other participant nodes update the model parameters of other participant nodes according to the parameters to be updated; and after the model training is finished, issuing reward resources according to the training data provided by each participant node in the training process, and writing the reward into the block chain. Compared with the traditional mode, the mutual trust problem of all parties is effectively solved; all parties participating in FL negotiate together to generate coordinator nodes, so that the transparency of the process is improved. The FL whole-process data is recorded in a block chain, so that the traceability of data operation is ensured. All parties are encouraged to participate actively by rewarding resources, and the enthusiasm of the parties is improved.

However, the aforementioned prior-art methods all ignore the problems of low consensus and learning efficiency caused by the nature of a BFL structure when the number of participants is large. If the data provided by the present participating parties are too sparse to support the training task of an FL model, one direct solution is to increase the number of participating parties. Since participating parties reach consensus with each other through broadcast communication, the communication frequency increases with the number of participating parties, leading to high communication overheads and low consensus efficiency.

Further, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with technical features known in the art as support.

SUMMARY OF THE INVENTION

In order to solve the problems of existing knowledge, the present invention provides a method for cross-chain consensus oriented to FL, comprising: conducting intra-cluster single-chain BFL and collecting local update information; sending update consensus information to a second federation so as to execute cross-cluster gradient exchange; receiving a verification result of cross-cluster gradient update consensus fed back from the second federation; and conducting local model update based on the verification result.

Preferably, the step of conducting intra-cluster single-chain BFL and collecting local update information further comprises: sending the local update information computed based on a BFL model in a first federation to a first computing node in the cluster so as to conduct update fusion consensus within the cluster.

According to the present invention, FL at participating parties will not be undesirably terminated in the event of breakdowns of any coordinating server. The disclosed consensus mechanism can secure data consistency and operational consistency of most computing nodes even if a small number of computing nodes break or even become evil. BFL as disclosed herein is designed for decentralized model update, so it will not be undesirably terminated in the event of coordinating server breakdown.

Preferably, the method further comprises: while a cluster representative in the first federation sends the update information posterior to fusion consensus to the second federation, having at least one second computing node in the second federation conduct two-department verification consensus to the update information and feed the verification result with respect to the cross-cluster gradient update consensus back to the first federation.

The key technical schemes adopted by the present invention include: (1) Clusters are split according to organizations they belong to; and (2) since model exchange among clusters only contains fused data, the privacy of individual computing nodes is hidden.

Opposite to the prior art methods where a hostile coordinating server may retroactively infer distribution of original data using the update information provided by individual computing nodes, the present invention can eliminate the risk of privacy violation. Conventional single-cluster FL is about building all computing nodes into a big cluster and broadcasting model update among these computing nodes. To overcome this defect, the present invention employs a cross-federation consensus mechanism for a multi-cluster federation, wherein computing nodes are built into multiple small clusters each containing only the computing nodes of the same organization. With this configuration, only post-fusion model update has to be conducted among these small clusters. This helps to hide model data of the individual computing nodes to such an extent that the individual computing nodes are protected from privacy violation.

Preferably, the method further comprises: having the cluster representative of the first federation, according to a fusion determination mechanism, determine a local update result and a non-local update result fed back by the second federation, so as to obtain a determination result about whether the local model update is to be conducted.

Preferably, wherein conducting intra-cluster FL and reaching consensus further comprises: randomly selecting a computing node in each federation cluster as the cluster representative to participate in a cross-federation consensus process; having the cluster representatives vote based on verification results from at least two times of verification and determine whether the update consensus is accepted; and after implementation of the update consensus, giving rewards or punishments based on the consensus results of the at least two times of verification from the cluster representatives.

Preferably, wherein the cluster representatives are selected through: defining that every said cluster representative has a tenure, upon the end of the tenure, every said computing node in the cluster applying for being the next representative by sending a blockchain transaction; and sorting candidates according to pledged asset values thereof, wherein the first $t^{th}$ candidates form a nomination pool and using a randomized algorithm to select the representative from the nomination pool.

Preferably, wherein the step of having the cluster representatives vote based on verification results from at least two verifications and determine whether the updates are accepted further comprises: having the cluster representative execute the first time of verification in the $(r-1)^{th}$ round of operation, and execute the second time of verification in the $r^{th}$ round of operation, and where the result of the second time of verification is superior to the result of the first time of verification, having the cluster representatives vote to accept all past rounds of operation.

Preferably, wherein the step of giving rewards or punishments based on the consensus results of the at least two verifications from the cluster representatives further comprises: denoting the consensus results of the at least two verifications of the cluster representatives as $t_a$ and $t_b$, respectively; according to relationship between $t_a$ and $t_b$ and the pledged asset values provided by the cluster representatives, giving the rewards/punishments to the cluster representatives:

$$rp = \begin{cases} -v, & t_b - t_a > \lambda \\ 0, & 0 \leq t_b - t_a \leq \lambda \\ \mu v(t_a - t_b), & t_a > t_b \end{cases}$$

when $t_b$ is greater than $t_a$, and a difference therebetween is greater than $\lambda$, determining that the operation of the relevant cluster representative is useless, and expropriating the pledge it provides; when $t_b$ is greater than $t_a$, but the difference therebetween is smaller than $\lambda$, determining that some errors exist in the operation of the relevant cluster representative, and not expropriating the pledge it provides although the operation is useless; when $t_a$ is greater than $t_b$, determining that the operation of the cluster representative is contributive to model update, and giving the reward in a certain proportion to the pledged asset value it provides and a contribution level it makes, in which rp represents a reward/punishment result, v represents the pledged asset value, and μ represents a reward proportion.

The present invention further provides a system for cross-chain consensus oriented to FL, wherein the system at least comprises a cross-cluster FL module and a cross-cluster consensus module, a first computing node in a first federation, based on the cross-cluster FL module, conduct intra-cluster single-chain FL and collect local update information, the cross-cluster consensus module sends the updates by intra-cluster consensus to a second federation, the cross-cluster consensus module receives a verification result of cross-cluster gradient update consensus fed back from the second federation, the cross-cluster FL module conducts local model update based on the verification result.

Preferably, wherein the cross-cluster consensus module comprises a fusion mechanism module, the fusion mechanism module, according to a fusion determination mechanism, determine a local update result and a non-local update result fed back by the second federation, so as to obtain a determination result about whether the remote model update should be accepted.

To address the issue of the prior-art method that malicious participating parties may poison the whole model by submitting inferior update parameters, the present invention introduces a fusion mechanism module to the consensus process to locally check updates before accepting them. Then blockchain consensus is reached based on the check results of the computing nodes. Only the updates that pass the consensus process can be accepted by individual computing nodes. An inferior update parameter will bring a check result of "not accepted" at an honest node, so the final consensus result is also "not accepted".

Preferably, the program executed by the cross-cluster FL module comprises: sending the local update information computed based on a BFL model in a first federation to the first computing node in the cluster so as to conduct the consensus of updates within the cluster.

Preferably, while a cluster representative in the first federation sends the update information posterior to fusion consensus to the second federation, having at least one second computing node in the second federation conduct two-step verification consensus to the update information and feed the verification result with respect to the cross-cluster gradient update consensus back to the first federation.

Preferably, a first fusion determination module, according to a fusion determination mechanism, determines a local update result and a non-local update result fed back by the second federation, so as to obtain a determination result about whether the local model update should be accepted.

Preferably, the cross-cluster consensus module comprises a representative selection module, a consensus module and a reward/punishment module. The representative selection module randomly selects a computing node in each federation cluster as the cluster representative that participates in the cross-federation consensus process. The consensus module vote based on verification results from at least two times of verification and determine whether the update consensus is accepted. After implementation of the update consensus, giving rewards or punishments based on the consensus results of the at least two times of verification from the cluster representatives.

Preferably, the program steps executed by the representative selection module comprises: defining that every said cluster representative has a tenure r, upon the end of the tenure, every said computing node in the cluster applying for being the next representative by sending a blockchain transaction; and sorting candidates according to pledged asset values thereof, wherein the first $t^{th}$ candidates form a nomination pool and using a randomized algorithm to select the representative from the nomination pool.

After implementation of the update consensus, the present invention provides rewards and punishments based on the contributions of the cluster representatives, thereby encouraging the cluster representatives in the computing nodes to vote honestly, so that the participants can actively help the model update.

Preferably, the program steps executed by the consensus module comprises: having the cluster execute the first time of verification in the $(r-1)^{th}$ round of operation, and execute the second time of verification in the $r^{th}$ round of operation, and where the result of the second time of verification is superior to the result of the first time of verification result, having the cluster vote to accept all past rounds of operation.

Preferably, the program steps executed by the reward/punishment module comprises: denoting the consensus results of the at least two times of verification of the cluster representatives as $t_a$ and $t_b$, respectively; according to relationship between $t_a$ and $t_b$ and the pledged asset values provided by the cluster representatives, giving the rewards/punishments to the cluster representatives:

$$rp = \begin{cases} -v, & t_b - t_a > \lambda \\ 0, & 0 \le t_b - t_a \le \lambda \\ \mu v(t_a - t_b), & t_a > t_b \end{cases}$$

when $t_b$ is greater than $t_a$, and a difference therebetween is greater than $\lambda$, determining that the operation of the relevant cluster representative is useless, and expropriating the pledge it provides; when $t_b$ is greater than $t_a$, but the difference therebetween is smaller than $\lambda$, determining that some errors exist in the operation of the relevant cluster representative, and not expropriating the pledge it provides although the operation is useless; when $t_a$ is greater than $t_b$, determining that the operation of the cluster representative is contributive to model update, and giving the reward in a certain proportion to the pledged asset value it provides and a contribution level it makes, in which rp represents a reward/punishment result, v represents the pledged asset value, and $\mu$ represents a reward proportion.

DETAILED DESCRIPTION OF THE INVENTION

Figure 1:
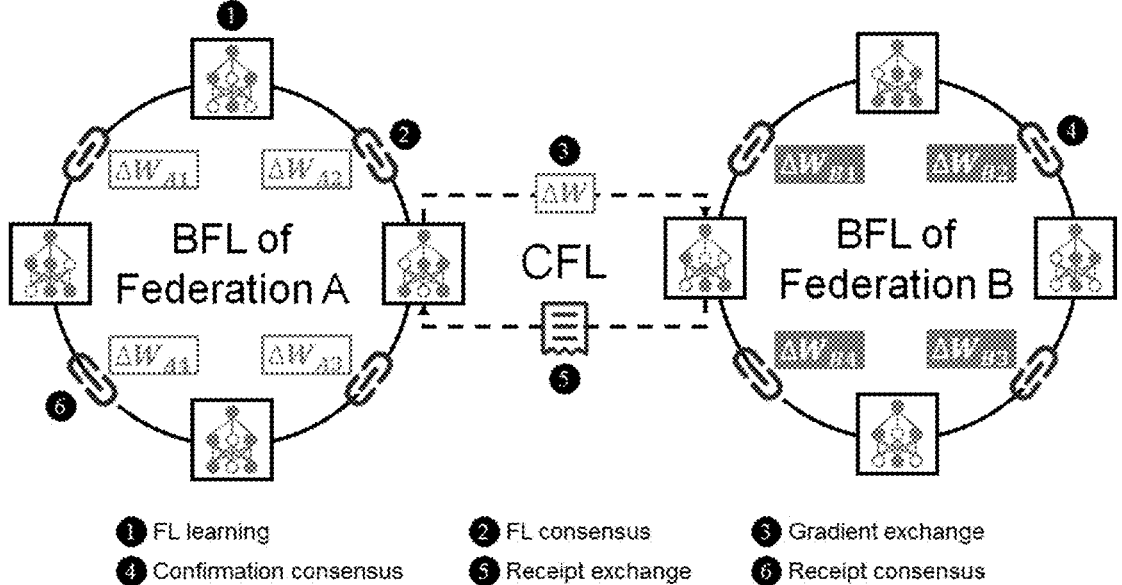
FIG. 1 is a logic diagram of cross-cluster FL between two clusters according to the present invention, which also illustrates gradient fusion across clusters.

The present invention will be described in detail with reference to the accompanying drawings.

To address the shortcomings of the prior art, the present invention provides a method and system for cross-chain consensus oriented to FL.

The disclosed system for cross-chain consensus at least includes a cross-cluster FL module (hereinafter referred to as the CFL module) and a cross-cluster consensus module (hereinafter referred to as the CC module). A computing node has both the CFL module and the CC module. In the present invention, the CFL module and the CC module may each be realized in terms of hardware using one or more of an application specific integrated circuit, a server, and a server group.

In the present invention, the CFL module contains therein a BFL model for single-cluster FL and a CFL model for cross-cluster FL.

The CC module serves to use the blockchain cross-chain technology to realize high-performance and secure cross-cluster FL.

Herein, a cluster refers to all the computing node owned by an individual participating party. For example, in a medical IoT, a cluster refers to all sensors, servers, and computers in a hospital.

In the present invention, the BFL model is as detailed below.

It is assumed that a cluster includes K computing nodes, and every node processes $s_k$ samples, where $1 \le k \le K$. Given that $w_k$ is the parameter for the learning model, the goal of training a local learning model is to minimize the objective function g ($w_k$), as shown below:

$$g(w_k) = \frac{1}{s_k} \sum_{i=1}^{s_k} l\left(x_{k_i}, y_{k_i}, w_k\right) \tag{1}$$

where $l(x_{k_i}, y_{k_i}, w_k)$ represents the loss function, $x_{k_i}, y_{k_i}$ represent the sample i and the corresponding label, respectively, $w_k$ represents the parameter of the learning model. The present invention improves the model performance of each federation cluster by minimizing the FL objective function g (w). Given that $\mathbb{S}$ is the total number of the samples in the cluster, g(w) can be calculated as below:

$$g(w) = \sum_{k=1}^{K} \frac{s_k}{\mathbb{S}} g(w_k) \tag{2}$$

Preferably, in the present invention, the BFL model learns at least by means of BFL gradient fusion and BFL model fusion.

BFL gradient fusion involves a process where each computing node uploads its local model gradient to the chain, and the fusion gradient is computed after consensus is reached, before the fusion gradient is used to update the local learning model.

Specifically, each computing node computes the local model gradient $\nabla w_k$ as below:

$$\nabla w_k = \nabla g(w_k) \tag{3}$$

Since there is not a centralized server in the CFL module for data fusion, every computing node uses Equation (3) to fuse its local gradient and the gradient of the other nodes, so as to determine the BFL fusion gradient $\overline{\nabla w}_t$ At the time t:

$$\overline{\nabla w}_t = \sum_{k=1}^{K} \frac{s_k}{\mathbb{S}} \nabla w_{k_t} \tag{4}$$

Given that $\eta$ represents learning speed, the parameter model obtained after the $t^{th}$ round of training is as below:

$$w_{k_{t+1}} = w_{k_t} - \eta \overline{\nabla w}_t \tag{5}$$

Preferably, the CFL module contains therein an FL model update module, which may be one or more of an application specific integrated circuit, a server, and a server group.

The FL model update module serves to using the model parameters of the individual computing nodes in the fusion federation to jointly train the local model in each node.

The BFL model fusion involves a process where each computing node records the updated model in the block-chain, and the fusion module updates the local models.

Specifically, each computing node first updates its local model, and then uses Equation (7) to compute the model fusion:

$$w_{k_{t+1}} = w_{k_t} - \eta \nabla w_{k_t} \qquad (6)$$

$$\overline{w}_{t+1} = \sum_{k=1}^{K} \frac{s_k}{\mathbb{S}} w_{k_{t+1}} \qquad (7)$$

Afterward, the local learning model on each computing node is updated:

$$w_{k_{t+1}} = \alpha w_{k_{t+1}} + (1 - \alpha)\overline{w}_{t+1}, \alpha \in (0, 1) \qquad (8)$$

To implement cross-cluster FL, fusion of the CFL model at least involves CFL gradient fusion and CFL model fusion.

The CFL gradient fusion is realized as below. Defining that there are M BFL clusters participating in the learning process, and every cluster contains $n_m$ computing nodes, where $1 \leq m \leq M$, the cross-cluster fusion gradient $\nabla \overline{w}_c$ can be calculated as below:

$$\nabla \overline{w}_c = \sum_{m=1}^{M} \frac{n_m}{M} \nabla w_m \qquad (9)$$

where $\nabla w_m$ is the fusion gradient for each cluster calculated using Equation (4). At last, $\nabla \overline{w}_t$ in Equation (5) is replaced with $\nabla \overline{w}_c$ obtained during the $t^{th}$ round of learning, so as to realize multi-federation cluster update.

The CFL model fusion $\overline{w}_c$ is calculated using Equation (10). By replacing $\overline{w}_{t+1}$ in Equation (8) with $\overline{w}_c$, the CFL cross-federation cluster model fusion can be realized.

$$\overline{w}_c = \sum_{m=1}^{M} \frac{n_m}{M} \overline{w}_m \qquad (10)$$

In order to further reduce the communication overheads required by the CFL module, and to ensure effectiveness of CFL model update, the CFL module of the present invention further comprises a fusion determination module, which may be one or more of an application specific integrated circuit, a server, and a server group.

The fusion determination module determines the cross-cluster fusion gradient $\nabla \overline{w}_c$, for each round of learning using a fusion determination mechanism or determines whether the CFL model fusion $\overline{w}_c$ can be used for local model update.

The fusion determination mechanism adopts the following method for determination.

Every computing node in a cluster verifies the cross-cluster fusion gradient $\nabla \overline{w}_c$ or the CFL model fusion $\overline{w}_c$ it receives, and records the verification result (agreeing to conduct the update or not) in the local chain. If in a cluster the share of nodes agreeing to update is greater than a threshold δ, the cluster agrees to conduct the update.

Then the cluster has a representative node randomly selected to upload its decision about whether to conduct the update to representative nodes of other clusters.

At last, each representative node determines whether to accept the updates according to the decisions of the other clusters and its local verification.

The CC module at least includes three modules: a representative selection module, a consensus module, and a reward/punishment module. Each of the representative selection module, the consensus module, and the reward/punishment module may be realized in terms of hardware using one or more of an application specific integrated circuit, a server, and a server group.

The representative selection module randomly selects a computing node in each federation cluster as the cluster representative that participates in the cross-federation consensus process. The representatives for the federation clusters are selected once every $r^{th}$ round of consensus. In other words, every representative has a tenure of r. Upon the end of the tenure, every computing node in the clusters may issue a blockchain transaction by which it applies for being the next representative. The candidates have to pledge some assets for the application transaction.

It is assumed that the $i^{th}$ candidate provides an asset having a value of $v_i$. All candidates are sorted by $v_i$, and the candidates having the first $t^{th}$ places form a nomination pool. At last, the representative is selected from the nomination pool using a randomized algorithm.

The randomized algorithm used herein determines the representative by performing a modulo operation on the Hash value of the last block at the time t. All transaction records will be stored in the blockchain, so the representative selection process is verifiable and traceable.

The transactions are recorded in the data format of <type, proposer_id, mortgage, term_num, sign>. Therein, type is an enumeration variable, indicating the type of the transaction; proposer_id is the exclusive identity label of the proposer of the transaction; mortgage, term_num, and sign represent the pledged value of the node, the current consensus period and the signature, respectively.

The consensus module consists of a (r−1) round of update fusion and one round of two-phase cross-chain consensus (2PCC), thereby achieving secure cross-chain FL. The two phases are a preparation phase and a confirmation/rollback phase, respectively.

In the preparation phase, every cluster representative conducts two times of verification. The first time is about verifying the model in the first (r−1) rounds, and the second time is to verify the $r^{th}$ round of update. If the result of the second time is superior to that of the first time, the cluster representatives vote to accept all the past operations. Otherwise, the cluster representatives vote to not receive all the past operations. Additionally, every cluster select is cluster representative during the preparation phase.

In the phase, the format of the transaction data is <type, proposer_id, grad, hash_sample, round_num, sign>. Therein, round_num is the number of rounds of update, and grad is the update gradient. If model updating is used instead, the field of grad may be changed to model, indicating the model to be updated.

The confirmation/rollback phase is about determining whether the current updates should be accepted according to the result of the preparation phase. Specifically, if the consensus results from the local and remote clusters are all accepted, the update confirmed by the operations of the past cycles is executed. Otherwise, the operation of the previous cycle is not accepted, and all the models roll back to the previous state. It is to be noted that rollback is not a branch of the blockchain, and all the past operations are stored in the chain.

In the phase, the format of the transaction data is <type, format, body, round_num, sign>. Therein, body is the confirmation content (such as the confirmed gradient), and format is an enumeration variable, representing the type of body.

The reward/punishment module uses rewards and punishments to urge the cluster representatives to act honestly. In the preparation phase, every cluster representative provides two verification results for consensus. The consensus result according to the two times of verification of some cluster representative may be represented as $t_a$ and $t_b$, respectively. The reward/punishment module according to the relationship between $t_a$ and $t_b$ and the pledge v provided by the representative give a reward/punishment to the cluster representative:

$$rp = \begin{cases} -v, & t_b - t_a > \lambda \\ 0, & 0 \le t_b - t_a \le \lambda \\ \mu v(t_a - t_b), & t_a > t_b \end{cases} \quad (11)$$

If $t_b$ is greater than $t_a$, and the difference therebetween is greater than $\lambda$, the operation of the representative may be deemed as useless, and the pledge it provides is expropriated. If $t_b$ is greater than $t_a$, but the difference is smaller than $\lambda$, this means that there is an error in the operation of the representative. At this time, although the result is useless, the pledge is not expropriated. If $t_a$ is greater than $t_b$, the operation of the representative is contributive to model update, and a reward in a certain proportion $\mu$ to the pledge it provides and the contribution level it makes is given. Herein, $\lambda$ refers to the result difference threshold. Therein, rp represents the reward/punishment result, v represents the pledged asset value, and $\mu$ represents the reward proportion.

In this phase, the format of transaction data is <type, proposer_id, app_tx_id, value, sign>. Therein, app_tx_id is the label of the transaction application previously raised by the representative, and value is the reward/punishment result rp.

Figure 2:
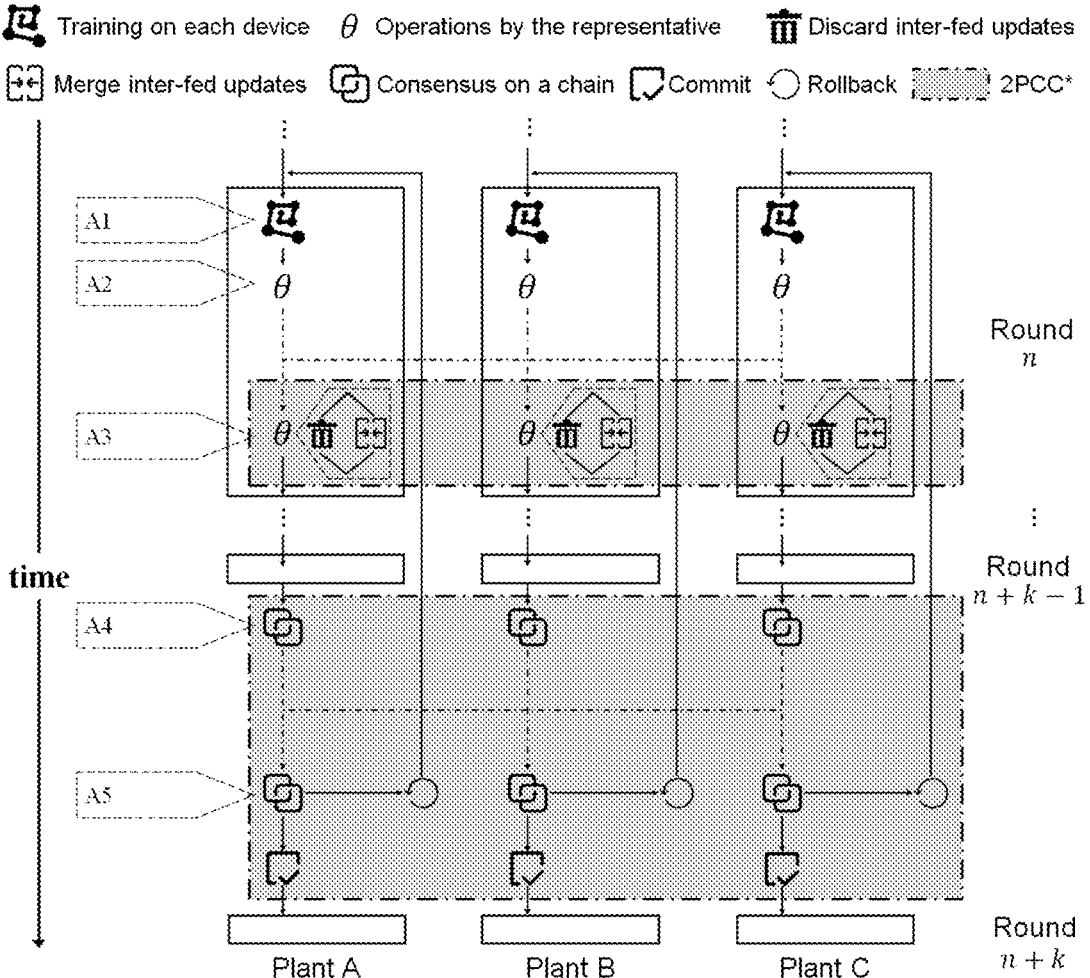
FIG. 2 is a working flowchart of cross-chain cluster consensus according to the present invention.
Figure 3:
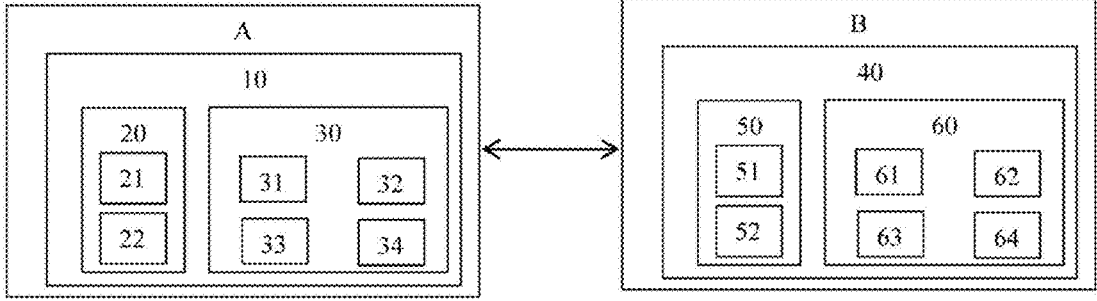
FIG. 3 is a structural diagram of one implementation of the present invention.

FIG. 1 through FIG. 3 illustrate a system for cross-chain consensus oriented to FL.

In the system for cross-chain consensus oriented to FL, several first compute nodes 10 in the first federation A and several second computing nodes 40 in the second federation B establish mutual communication connection in a wired or wireless manner.

Several first computing node 10 in the first federation A have mutual communication connection for intra-cluster FL in the first federation. The first compute node 10 contains therein a first CFL module 20 and a first CC module 30.

The first CFL module 20 at least includes a first learning module 21. The first learning module 21 is provided with a BFL model for single-federation cluster learning and a CFL model for cross-federation cluster learning, being able to execute the program of the federation cluster learning model and to update the local learning model.

Preferably, the first CFL module 20 further comprises a first update module 22, which uses the model parameters of the computing nodes in the fusion federation to jointly train the local model in each node.

The first CC module 30 includes a first representative selection module 31, a first consensus module 32, and a first reward/punishment module 33. The first CC module 30 further comprises a first fusion determination module 34.

Similarly, the second federation B has a structure similar or identical to that of the first federation A.

As shown in FIG. 3, several second computing nodes 40 in the second federation B have mutual communication connection for intra-cluster FL in the second federation. The second computing node 40 contains therein a second CFL module 50 and a second CC module 60.

The second CFL module 50 at least includes a second learning module 51. The second learning module 51 contains therein a BFL model for single-federation cluster learning and a CFL model for cross-federation cluster learning, being able to execute the program of the federation cluster learning model and to update the local learning model.

Preferably, the second CFL module 50 further comprises a second update module 52, which uses the model parameters of the computing node in the fusion federation to jointly train the local model in each node.

The second CC module 60 includes second representative selection module 61, second consensus module 62, and second reward/punishment module 63. second CC module 30 further comprising second fusion determination module 64.

Step S1 is about intra-cluster FL.

The first computing node in the first federation uses the cross-cluster federated learning module to perform intra-cluster FL and collect local update information.

For example, the first CFL module uses the BFL gradient fusion module or the BFL model fusion module to update the local learning model of each first computing node.

Step S2 is about reaching consensus in the cluster.

The first CFL module of each first computing node in the first federation (Federation A) sends its update information to other first computing nodes in the same cluster for intra-cluster update fusion consensus, and records the result in the first CFL module of the first federation A. Intra-cluster consensus may be reached using a conventional single-blockchain consensus method, such as Practical Byzantine Fault Tolerance (PBFT).

Step S3 is about gradient exchange across clusters.

In each cluster of the first federation (Federation A), the cluster representative selected by the first representative selection module 31 of the first CC module 30 sends the update information in the cluster to the second federation B (Hospital B) over the communication network.

Preferably, the first representative selection module 31 randomly selects a first computing node in each federation cluster as the cluster representative that participates in the cross-federation consensus process.

Each of the cluster representatives of first federation (A) send the local update result and the non-local update result from the cluster representative of the second federation (B) to the first fusion determination module 30.

The first fusion determination module 30 based on the local first update result and the update result sent by the cluster representative of the second federation (B) determine whether local model update is to be conducted.

Specifically, the first fusion determination module 30 uses the fusion determination mechanism to determine whether the cross-cluster fusion gradient $\nabla w_c$ or the model fusion $\overline{w}_c$ of every round of learning can be used for local model update.

The first CC module in every first computing node in the cluster verifies the received cross-cluster fusion gradient $\nabla w_c$ or the model fusion $\overline{w}_c$, and record the verification result (agreeing to update or not) in the local chain. If in a cluster the share of nodes agreeing to update is greater than a threshold $\delta$, the first fusion determination module 30 confirms that the cluster agree to update. For update decision that the share of nodes agreeing to update is below the threshold $\delta$, the fusion determination module determine that the update decision is discarded and informs each computing node give up the update. Then, the cluster has the cluster representative randomly selected upload the decision about whether to update to the cluster representatives of other clusters.

At last, each cluster representative according to the decision results from other cluster representatives and local verification determines whether to adopt update of this round.

After the first fusion determination module 30 makes the update decision, the process enters the preparation phase for consensus.

The cluster representative of the first federation (A) sends the update decision information to the second CC module of the second federation over the communication network. The second CC module receives the verification result for cross-cluster gradient update consensus as fed back by the second federation.

Step S4 is cross-cluster gradient update consensus.

Each of the second computing nodes 30 in the second federation (B) performs two-department verification consensus on the update information sent by the first CC module 30, and records the result in the second CFL module of the second federation B. Two-department verification consensus performed by the second module execute includes a preparation phase and a confirmation/rollback phase, and the time window is indicated by the grey area in FIG. 3.

In the preparation phase, every cluster selects a cluster representative. Every cluster representative conducts two times of verification. The first time is about verifying the model in the first (r−1) rounds, and the second time is to verify the $r^{th}$ round of update. If the result of the second verification is superior to that of the first verification, the cluster votes to accept all the past operations. Otherwise, the cluster votes to not accept all the past operations.

In the confirmation/rollback phase, the second consensus module 62 according to the consensus result from the preparation phase determines whether the current update operation is to be accepted. Specifically, if the consensus results from the local and remote clusters are all accepting, the update confirmed by the operations of the past cycles is executed. Otherwise, the operation of the first computing node for the previous cycle is not accepted, and all the BEL models in the second CFL modules 50 of the second computing nodes roll back to the previous state. It is to be noted that rollback is not a branch of the blockchain, and all the past operations are stored in the chain.

Step S5 is about exchange of verification results.

Herein, the cluster representative of the second federation B sends the consensus result of agreeing to update to the first CC module of the first federation A over the communication network. Specifically, based on the update information and update decision sent by the second CC module, the second CFL module in the second computing node of the second federation B updates its own CFL gradient fusion and CFL model fusion.

The cross-cluster federated learning module executes local model update based on the verification result.

Step S6 is verification result consensus. The first federation A accepts the agreement result from the second federation B, and, after consensus is verified, the result is recorded in the CFL module of the first federation A. The reward/punishment module 14 in the CC module gives a reward/punishment to every cluster representative, and the rewards/punishments are recorded in the CFL chain.

Specifically, the reward/punishment module uses rewards and punishments to urge the cluster representatives to act honestly. In the preparation phase, every cluster representative provides two verification results for consensus. The consensus result according to the two times of verification of some cluster representative may be represented as $t_a$ and $t_b$, respectively. The reward/punishment module according to the relationship between $t_a$ and $t_b$ and the pledge v provided by the representative give a reward/punishment to the cluster representative:

$$rp = \begin{cases} -v, & t_b - t_a > \lambda \\ 0, & 0 \le t_b - t_a \le \lambda \\ \mu v(t_a - t_b), & t_a > t_b \end{cases} \tag{11}$$

If $t_b$ is greater than $t_a$, and the difference therebetween is greater than $\lambda$, the operation of the representative may be deemed as useless, and the pledge it provides is expropriated. If $t_b$ is greater than $t_a$, but the difference is smaller than $\lambda$, this means that there is an error in the operation of the representative. At this time, although the result is useless, the pledge is not expropriated. If $t_a$ is greater than $t_b$, the operation of the representative is contributive to model update, and a reward in a certain proportion $\mu$ to the pledge it provides and the contribution level it makes is given.

FIG. 2 shows the steps of federation selection for determining the cluster representative $\theta$.

Step A1 is local model training. Each of the federations performs local FL and training.

Step A2 is federation representative selection. Each of the federations uses the representative selection module to select at least one cluster representative $\theta$.

Step A3 is about selecting a representative again after n rounds of consensus. A fusion determination mechanism is used to confirm fusion or discard the update decision, which means discarding the update gradients between the federations or the update gradients among the fusion federations.

Step A4 corresponds to the preparation phase for cross-chain consensus. After (n+k−1) rounds of selection, in this phase, every cluster representative conducts two times of verification. The first time is about verifying the model in the first (r−1) rounds, and the second time is to verify the $r^{th}$ round of update.

Step A5 corresponds to the confirmation/rollback phase for cross-chain consensus. According to the result of the preparation phase, it is to determine whether the current update operation is accepted or not. If the current update operation is accepted, the process enters the confirmation phase. If the current update operation is refused, the operation of the previous cycle is not accepted, and all the models roll back to the previous state.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not come off the concept of the present invention should be encompassed by the appended claims.

The description of the present invention contains a number of inventive concepts, and the applicant reserves the right to file a divisional application based on each of the inventive concepts. The description of the present invention contains a number of inventive concepts, such as "preferably", "according to a preferred embodiment" or "optionally" all indicate that the corresponding paragraph discloses an independent idea, and the applicant reserves the right to file a divisional application based on each of the inventive concepts.

What is claimed is:

1. A method for cross-chain consensus oriented to federated learning, comprising:

(1) conducting intra-cluster single-chain blockchain-based federated learning and collecting local update information, including sending the local update information computed based on a blockchain-based federated learning model in a first federation to a first computing node in a cluster so as to conduct update consensus within the cluster;

(2) sending update consensus information to a second federation so as to execute cross-cluster gradient exchange, including sending by a cluster representative in the first federation the update consensus information to the second federation, wherein a plurality of second computing nodes in the second federation have mutual communication connections for intra-cluster federated learning in the second federation;

(3) having at least one second computing node in the second federation conduct two-verification consensus to the update consensus information and feed verification results back to the first federation; and (4) conducting local model update in the first federation based on the verification results, wherein the two-verification consensus in step (3) comprises: conducting a first verification (a) and second verification (b) among cluster representatives in the second federation, wherein each cluster representative in the second federation provides a result ta in the first verification and a result tb in the second verification, wherein step (3) further comprises:

giving a reward/punishment to each cluster representative in the second federation based on the following rules:

when tb is greater than ta, and a difference therebetween is greater than a predefined threshold λ, determining that the operation of the relevant cluster representative is useless, and expropriating a pledged asset value the relevant cluster representative provides;

when tb is greater than ta, but the difference therebetween is smaller than λ, determining that some errors exist in the operation of the relevant cluster representative, and not expropriating the pledged asset value it provides although the operation is useless;

when ta is greater than tb, determining that the operation of the cluster representative is contributive to model update, and giving a reward in proportion to the pledged asset value and a contribution level the cluster representative makes, wherein step (4) further comprises:

having the cluster representative of the first federation, according to a fusion determination mechanism, determine a local update result and a non-local update result fed back by the second federation, so as to obtain a determination result about whether the local model update is to be conducted; and wherein each cluster representative is selected through the steps of:

(i) each computing node in each federation applying for being a cluster representative by sending a blockchain transaction and pledging an asset value;

(ii) sorting the computing nodes in each federation according to the pledged asset values;

(iii) forming a nomination pool for each federation by selecting a predefined number of computing nodes in each federation having pledged the greatest asset values from the sorted computing nodes of the federation; and (iv) selecting a cluster representative from the nomination pool for each federation using a randomized algorithm, wherein each cluster representative selected in step (iv) has a tenure and, at the end the tenure, a new cluster representative is selected according to step (i)-(iv).

2. A system for cross-chain consensus oriented to federated learning (FL), wherein the system at least comprises:

a cross-cluster FL module that conducts intra-cluster single-chain blockchain-based federated learning, collects local update information, and sends the local update information computed based on a blockchain-based federated learning model in a first federation to a first computing node in a cluster so as to conduct update consensus within the cluster;

a cross-cluster consensus module that sends update consensus information to a second federation so as to execute cross-cluster gradient exchange, including sending by a cluster representative in the first federation the update consensus information to the second federation, wherein a plurality of second computing nodes in the second federation have mutual communication connections for intra-cluster federated learning in the second federation, and has at least one second computing node in the second federation conduct two-verification consensus to the update consensus information and feed verification results back to the first federation;

a fusion mechanism module that conducts local model update in the first federation based on the verification results, wherein the two-verification consensus comprises: conducting a first verification (a) and second verification (b) among cluster representatives in the second federation, wherein each cluster representative in the second federation provides a result ta in the first verification and a result tb in the second verification, and wherein each cluster representative in the second federation is given a reward/punishment based on the following rules:

when tb is greater than ta, and a difference therebetween is greater than a predefined threshold λ, determining that the operation of the relevant cluster representative is useless, and expropriating the pledge the relevant cluster representative provides;

when tb is greater than ta, but the difference therebetween is smaller than λ, determining that some errors exist in the operation of the relevant cluster representative, and not expropriating the pledge it provides although the operation is useless;

when ta is greater than tb, determining that the operation of the cluster representative is contributive to model update, and giving a reward in proportion to the pledged asset value and a contribution level the cluster representative makes, wherein the fusion mechanism module conducts local model update in the first federation by having the cluster representative of the first federation, according to a fusion determination mechanism, determine a local update result and a non-local update result fed back by the second federation, so as to obtain a determination result about whether the local model update is to be conducted, and wherein each cluster representative is selected through the steps of:

(i) each computing node in a cluster applying for being a cluster representative by sending a blockchain transaction and pledging an asset value;

(ii) sorting computing nodes in each federation according to the pledged asset values;

(iii) forming a nomination pool for each federation by selecting a predefined number of computing nodes in each federation having pledged the greatest asset values from the sorted computing nodes of the federation; and (iv) selecting a cluster representative from the nomination pool for each federation using a randomized algorithm, wherein each cluster representative selected in step (iv) has a tenure and, at the end the tenure, a new cluster representative is selected according to step (i)-(iv).

\* \* \* \* \*